United States Patent
Maloney et al.

(10) Patent No.: US 7,382,303 B1
(45) Date of Patent: Jun. 3, 2008

(54) NON-PERTURBING POWER SUPPLY MARGIN CONTROLLER

(75) Inventors: Matthew J. Maloney, Colorado Springs, CO (US); Andrew J. Gardner, Colorado Springs, CO (US)

(73) Assignee: Linear Technology Corporation, Milpitas, CA (US)

( * ) Notice: Subject to any disclaimer, the term of this patent is extended or adjusted under 35 U.S.C. 154(b) by 0 days.

(21) Appl. No.: 11/523,561

(22) Filed: Sep. 20, 2006

(51) Int. Cl.
*H03M 1/04* (2006.01)
*G05F 1/00* (2006.01)

(52) U.S. Cl. .................... 341/155; 341/110; 341/118; 323/211; 323/222; 323/243; 323/282; 323/283

(58) Field of Classification Search ............... 323/211, 323/243, 283
See application file for complete search history.

(56) References Cited

U.S. PATENT DOCUMENTS

| 6,650,092 B1 * | 11/2003 | Lidak et al. ............... 323/207 |
| 6,774,612 B1 * | 8/2004 | Ballenger et al. ........... 323/303 |
| 6,900,994 B2 * | 5/2005 | Asayama ................. 363/21.01 |
| 7,027,944 B2 * | 4/2006 | Tabaian et al. ............ 702/106 |

| 2007/0001715 A1 * | 1/2007 | Brown et al. ............... 327/108 |

OTHER PUBLICATIONS

Summit Microelectronics, Inc. Single-Channel Supply Voltage Marginer and Active DC Output Controller. Information Data Sheet SMM105, Summit Microelectronics, Inc., 2005. (Sep. 20, 2005), 21 pages.
Summit Microelectronics, Inc. Single-Channel Supply Voltage Marginer/Monitor. Information Data Sheet SMM 150. Summite Microelectronics, Inc., 2005. (May 13, 2005), 22 pages.
Analog Devices. Super Sequencer with Margining Control and Temperature Monitoring. Technical Information Sheet ADM1062. Analog Devices, Inc. 2005, 36 pages.

* cited by examiner

*Primary Examiner*—Khai M Nguyen
(74) *Attorney, Agent, or Firm*—McDermott Will & Emery LLP

(57) ABSTRACT

A power supply margin controller may alter the voltage of a control signal used to control the output voltage of a power supply. The controller may include a digital-to-analog converter having an input and an output, and a comparator having a first input coupled to receive the control signal, a second input coupled to the output of the digital-to-analog converter, and an output. The controller may include a processing system configured to deliver data to the input of the digital-to-analog converter based on the output from the comparator that causes signals at the inputs to the comparator to be substantially equal.

32 Claims, 5 Drawing Sheets

NON-PERTURBING POWER SUPPLY MARGIN CONTROLLER

BACKGROUND

1. Technical Field

The subject matter pertains to power supplies and, more particularly, to power supply margin controllers.

2. Description of Related Art

A power supply margin controller is sometimes used to improve the accuracy of a power supply output by precisely monitoring output voltage or current and by applying needed corrections. A power supply margin controller may also alter the output of the power supply for test purposes, such as to determine whether components coupled to the output of the power supply still function properly when the output deviates from a nominal value.

A power supply margin controller may exercise the control that is needed to cause alterations in the output of a power supply through a connection with a feedback or voltage adjustment node. That node, however, may be very sensitive to the imposition of an external load or to the delivery of an external signal. This sensitivity may cause a problem when the power supply margin controller is coupled to or decoupled from the node while the power supply is driving a load. The coupling or decoupling at this time may perturb the output of the power supply, undesirably imposing potentially-harmful stress on the load.

SUMMARY

A power supply margin controller may alter the voltage of a control signal used to control the output voltage of a power supply. The controller may include a digital-to-analog converter having an input and an output, and a comparator having a first input coupled to receive the control signal, a second input coupled to the output of the digital-to-analog converter, and an output. The controller may include a processing system configured to deliver data to the input of the digital-to-analog converter based on the output from the comparator that causes signals at the inputs to the comparator to be substantially equal.

A power supply margin controller may include a digital-to-analog converter having an input and an output. It may include an analog-to-digital converter having a first analog input coupled to the control signal, a second analog input coupled to the output of the digital-to-analog converter, and a digital output representative of the difference between the first and second inputs. It may also include a processing system configured to deliver data to the input of the digital-to-analog converter based on the output from the analog-to-digital converter that causes the output of the analog-to-digital converter to be representative of a magnitude below a pre-determined threshold.

A power supply margin controller may include a processing system configured to receive and store information representative of the voltage of the control signal prior to the altering, to then temporarily cause an alteration in the voltage of the control signal, and to then cause the control signal to substantially return to its pre-altered voltage based on the stored information. The processing system may be configured to cause the alteration in a plurality of incremental steps and/or to cause the return in a plurality of incremental steps.

A matching voltage source may generate a voltage that substantially matches a reference voltage. It may include a controllable voltage source for generating a controllable voltage, and a comparator having a first input coupled to the controllable voltage source, a second input coupled to the reference voltage, and an output. It may also include a processing system configured to control the controllable voltage source based on the output from the comparator so as to cause both of the inputs to the comparator to be substantially equal.

These, as well as other components, steps, features, objects, benefits, and advantages, will now become clear from a review of the following detailed description of illustrative embodiments, the accompanying drawings, and the claims.

DETAILED DESCRIPTION OF ILLUSTRATIVE EMBODIMENTS

Figure 1:
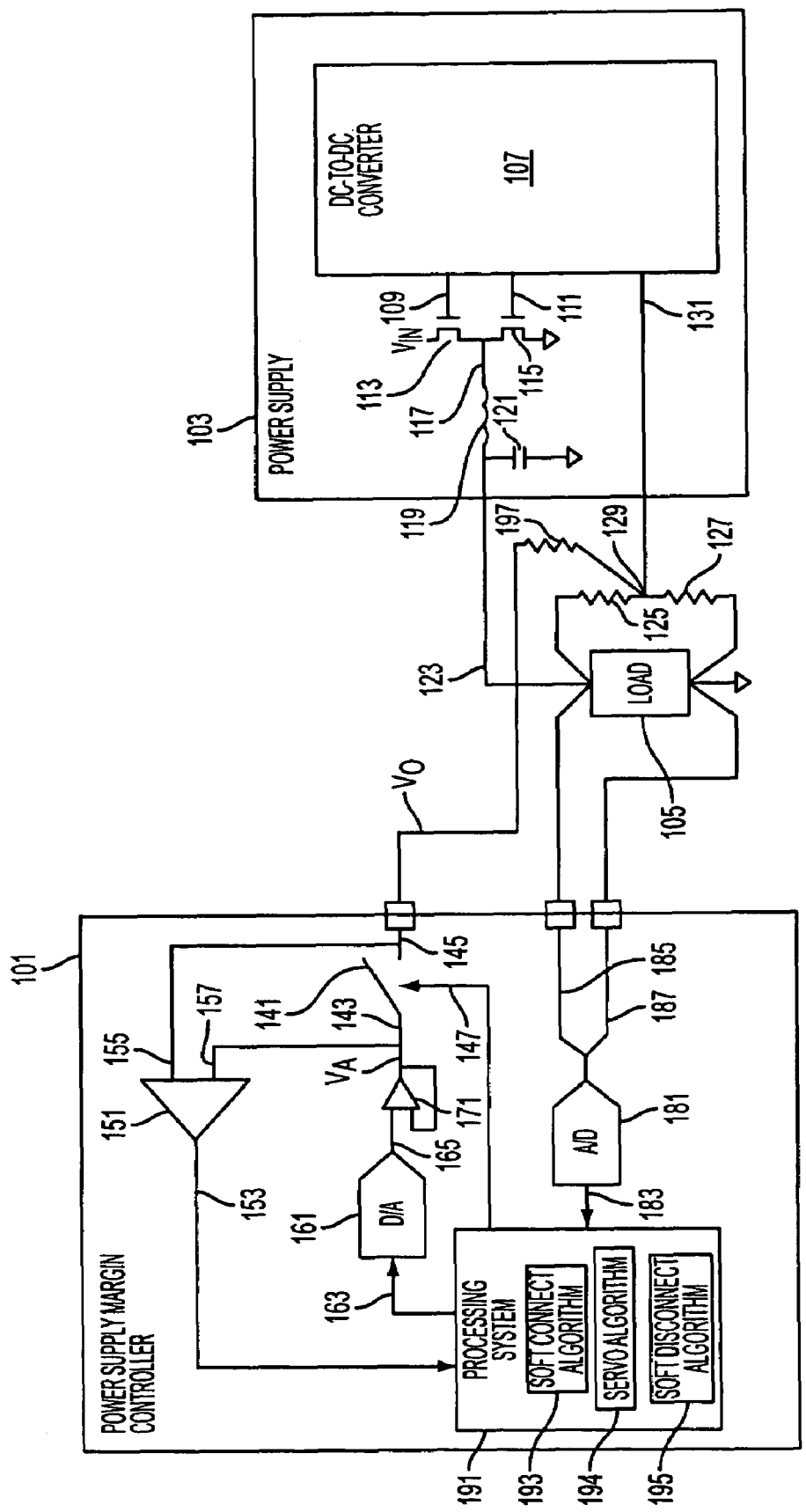
FIG. 1 illustrates a power supply margin controller, having a comparator that is coupled to a load, and an associated power supply.

FIG. 1 illustrates a power supply margin controller, having a comparator that is coupled to a buffer, and an associated power supply.

As shown in FIG. 1, a power supply margin controller 101 and a power supply 103 may both be coupled to a load 105.

The power supply 103 may be any type of power supply. It may include, for example, a DC-to-DC converter 107. Complementary outputs 109 and 111 of the DC-to-DC converter 107 may be coupled to a complementary set of output FETs 113 and 115. An output 117 of the FETs 113 and 115 may be coupled to a filtering inductance 119 and to a filtering capacitance 121. An output 123 of the LC filter may be coupled to the load 105.

The load 105 may be any type of load. For example, it may be one or more components in a computer, such as a microprocessor, memory, a mother board, a plug-in card, a hard drive, a CD drive, and/or a DVD drive.

A feedback node may provide feedback about the voltage on the load 105. A voltage divider network that is coupled to the load 105 may be used to create the feedback node. The voltage divider network may include a series of resistances, such as resistances 125 and 127. A tap 129 on the voltage divider network may serve as the feedback node.

The feedback node 129 may be coupled to a voltage feedback control input 131 of the DC-to-DC converter 107. The DC-to-DC converter 107 may be configured to utilize this feedback to drive the output FETs 113 and 115 so as to cause the output voltage 123 on the load 105 to be at a predetermined level.

In one embodiment, the complementary outputs 109 and 111 may be driven with complementary pulse-width-modulation signals. The complementary widths of the pulses may be controlled by the DC-to-DC converter 107, based on the feedback from the feedback node 129, so as to cause the output voltage 123 on the load 105 to be at the predetermined level. Other techniques to stabilize the output 123 to any desired predetermined level may be used in addition or instead.

The power supply margin controller 101 may be configured in a broad variety of ways. In one embodiment, the power supply margin controller 101 may include a controlled switch 141 having switching connections 143 and 145. The controlled switch 141 may have a control input 147 which, when energized, may cause the controlled switch 141 to close, thus coupling the switching connections 143 and 145.

The controlled switch 141 may be any type of controlled switch. For example, it may include or consist of a FET. It may additionally or instead include or consist of a BJT, an SCR, a relay, or any other type of controlled switching device. A manually-controlled switch may be used in addition or instead.

The power supply margin controller 101 may include a comparator 151. The comparator 151 may include an output 153 that switches state when the voltage of a first input 155 becomes more or less than the voltage of a second input 157. The comparator 151 may be any type of comparator. For example, it may be a one bit quantizer.

The power supply margin controller 101 may include a digital-to-analog converter 161. The digital-to-analog converter 161 may include an input 163 that receives digital data representative of a value. The digital-to-analog converter 161 may provide an output 165 that has a magnitude representative of the digital data input 163 to the digital-to-analog converter 161. The digital-to-analog converter 161 may be of any type.

The power supply margin controller 101 may include a buffer 171. The buffer 171 may produce an output $V_A$ that is substantially equivalent to its input, but capable of driving a more substantial load without degradation in the signal. The buffer 171 may be any type of buffer. It may be inverting or non-inverting.

The power supply margin controller 101 may include an analog-to-digital converter 181. The analog-to-digital converter 181 may be configured to produce a data output 183 that is representative of the difference between a first analog input 185 and a second analog input 187. The analog-to-digital converter 181 may be any type of analog-to-digital converter.

The power supply margin controller 101 may include a processing system 191 coupled to the output 153 of the comparator 151 and to the data output 183 of the analog-to-digital converter 181. The processing system 191 may be coupled to the input 163 of the digital-to-analog converter 181 and to the control input 147 of the controlled switch 141.

The processing system 191 may be any type of processing system. For example, it may include one or several processors and memories. The processing system 191 may be configured to perform the functions that the processing system is described herein as performing. It may be dedicated to these functions or may be a general purpose computer programmed to perform these functions. It may perform only these functions or may perform other functions. It may be implemented with hardware, software, firmware, or with any combination of these.

The processing system 191 may include a soft connect algorithm 193, a servo algorithm 194, and/or a soft disconnect algorithm 195. The algorithm 193, 194, and 195 may be configured to perform the functions that these algorithms are described herein as performing. The algorithm 193, 194, and 195 may be separate algorithms, as illustrated in FIG. 1, different parts of a single algorithm, or parts of several algorithms. As with the processing system 191, the algorithm 193, 194, and 195 may be implemented with hardware, software, firmware, or any combination of these.

The processing system 191 may be configured to implement the soft connect algorithm 193, 194, and 195 at the times described herein or at different times. The processing system 191 may be configured to implement these algorithms based on the output 153 from the comparator 151 and the data output 183 from the analog-to-digital converter 181, so as to control the data input 163 to the digital-to-analog converter 161 and the control input 147 to the controlled switch 141, all as described herein.

Figure 2:
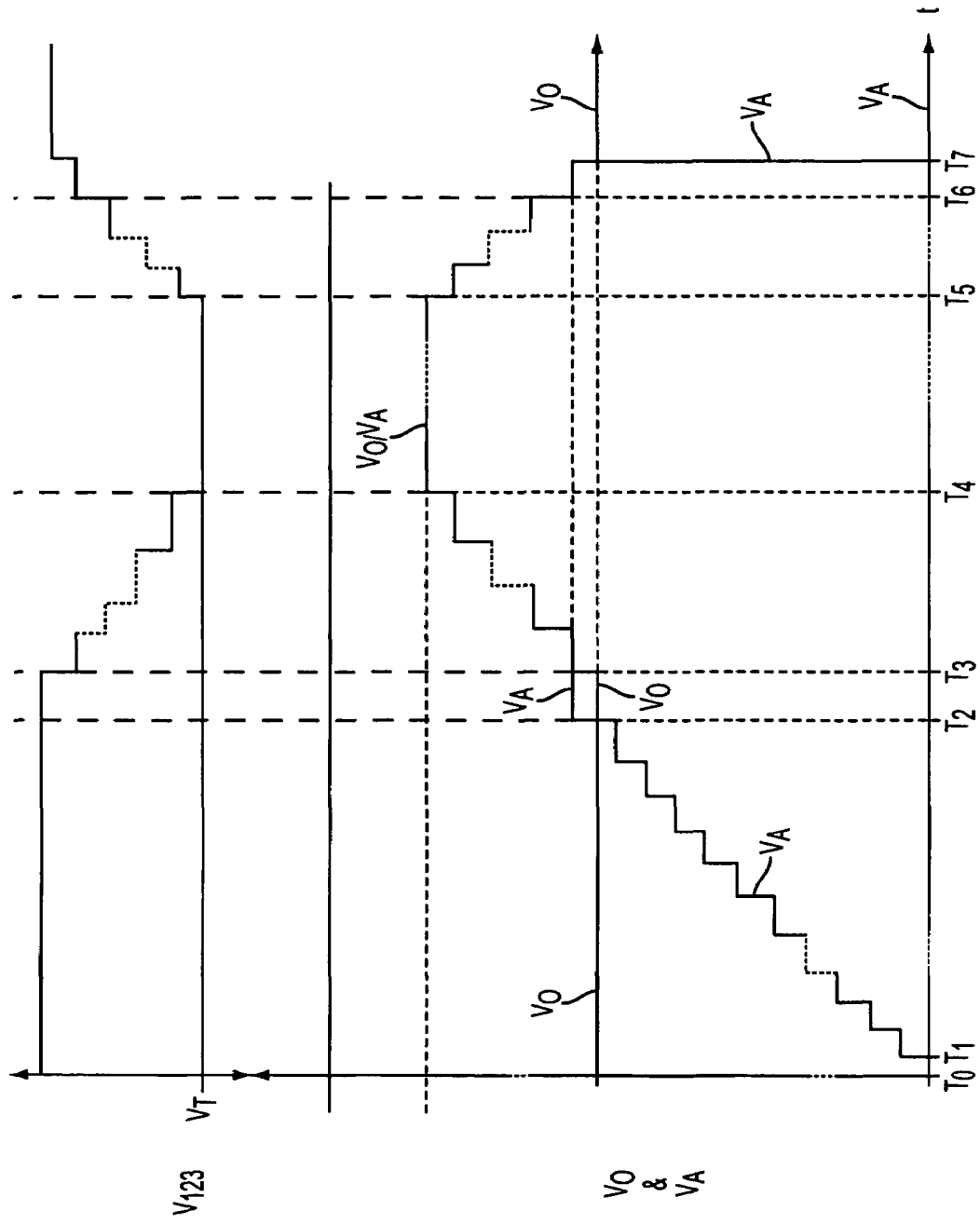
FIG. 2 illustrates three voltages that may be found in the power supply margin controller illustrated in FIG. 1.

FIG. 2 illustrates three voltages that may be found in the power supply margin controller illustrated in FIG. 1. Specifically, FIG. 2 illustrates voltage $V_A$ at the output of the buffer 171, voltage $V_O$ at the feedback node 129 after it is partially isolated from the feedback node 129 by a scaling resistance 197, and $V_{123}$ at the output of the power supply.

One mode of operation of the power supply margin controller 101 shown in FIG. 1 using one embodiment of the algorithm 193, 194, and 195 will now be discussed in conjunction with the voltages illustrated in FIG. 2. Other embodiments may be used in addition or instead that may result in the same or different voltages.

At time $T_0$, the controlled switch 141 may be open. At this time, the power supply 103 may cause an output voltage to appear on the load 105 that approximates a predetermined amount. A scaled version of the load voltage may appear at the feedback node 129 and, in turn, as $V_O$, which is one of the traces illustrated in FIG. 2.

Also at the time $T_0$, the processing system 191 may be configured to deliver a data value to the input 163 of the digital-to-analog converter 161 so as to cause its output 165 to be approximately zero, as reflected by the zero volt value of the trace $V_A$ in FIG. 2 at time $T_0$.

Also at the time $T_0$, the processing system 191 may receive an alter command to alter the output 123 from the power supply 103. The alter command may direct the processing system 191 to increase or decrease the output voltage to a specified target level $V_T$.

The processing system 191 may receive the alter command from any source and through any means. For example, it may receive the alter command from a user through a user interface (not shown) and/or an automated system (not shown). The alter command may flow though a interface, such as a buss or port.

The processing system 191 may be configured to deliver an input to the feedback node 129 that causes the commanded alteration in the output 123 of the power supply. The processing system may do this by delivering data to the input 163 of the digital-to-analog converter 161 that causes its output 165, when coupled to the feedback node 129 through the buffer 171, the controlled switch 141 and the scaling resistance 197, to cause the output 123 to be at the level $V_T$ commanded by the alter command.

At the time the processing system 191 receives the alter command, however, $V_A$ may be substantially different from $V_O$. If the processing system 191 nevertheless directs the closure of the controlled switch 141 at this time, this might cause a substantial and undesirable perturbation at the feedback node 129.

Instead, the processing system may be configured to implement the soft connect algorithm 193 after receipt of the alter command which, in turn, may be configured to cause the processing system 191 to adjust $V_A$ so that it is substantially equal to $V_O$ before closing the switch 141. Thereafter, the processing system 191 may be configured to close the switch 141 and to then implement the servo algorithm 194. The servo algorithm 194 may be configured to cause the processing system 191 to gradually adjust $V_A$ until the output 123 of the power supply 103 reaches the level commanded by the alter command $V_T$.

One example of how the soft connect algorithm 193 and the servo algorithm 194 may be configured to implement these processes is now discussed. Other configurations may be used in addition or instead to implement these or other processes.

The soft connect algorithm 193 may be configured to first check the polarity of the output 153 from the comparator 151 to determine the direction that $V_A$ needs to change in order for it to substantially match $V_O$ before ordering the closure of the controlled switch 141. The soft connect algorithm 193 may be configured to then deliver incrementally changing data values to the input 163 of the digital-to-analog converter 161 to cause $V_A$ to incrementally approach $V_O$.

For example, the polarity of the output 153 from the comparator 151 may indicate that $V_A$ needs to increase in order to match $V_O$. The soft connect algorithm 193 may be configured to cause $V_A$ to incrementally increase beginning at a time $T_1$, as shown in FIG. 2. During these initial incremental steps, the soft connect algorithm 193 may be configured to leave the controlled switch 141 open, thus insuring that $V_O$ and, in turn the feedback node 129, is not disturbed, as shown in FIG. 2.

There may come a time $T_2$ when an incremental increase in $V_A$ causes $V_A$ to exceed (or fall below) $V_O$, as shown in FIG. 2. When this happens, the output 153 of the comparator may change state.

The value of $V_A$ and $V_O$ may be substantially equal immediately after the output 153 of the comparator changes state. However, they may not be identical. The degree of difference may be controlled by the size of the incremental steps between times $T_1$ and $T_2$. Smaller steps may provide a higher degree of resolution and accuracy, while larger steps may result in faster operation and/or a lower cost for the digital-to-analog converter 161.

The soft connect algorithm 193 may be configured to detect the change in state of the comparator 151 and to then cause the controlled switch 141 to close by delivering a close command to the input 147 of the controlled switch 141 at a time $T_3$. The closure of the controlled switch 141 may then force $V_O$ to be essentially equal to the value of $V_A$ (differing, perhaps, by any threshold in the controlled switch 141), as reflected in FIG. 2.

Altering $V_A$ to be substantially equal to $V_O$ before coupling the power supply margin controller 101 to the feedback node 129 may minimize perturbation of the feedback node 129. In turn, this may minimize disturbing the load 105.

The processing system 191 may be configured so as to next cause the servo algorithm 194 to take over control of the data value that is delivered to the input 163 of the digital-to-analog converter 161 and, in turn, the voltage $V_A$ that is applied to the feedback node 129.

The servo algorithm 194 may be configured so as to cause the output 123 of the power supply 103 to change to the $V_T$ value that the processing system 191 had been commanded to seek by the alter command. The servo algorithm 194 may be configured to cause this change in incremental steps, so as to soften the effect of the change on the load 105. The servo algorithm 194 may be configured to continue incrementing the value of $V_A$ until $V_A$ reaches the target $V_T$ at a time $T_4$, as shown in FIG. 2. Although shown in FIG. 2 as increasing in value, $V_A$ may instead decrease in value to reach $V_T$ if the alter command was instead to increase the output voltage 123 of the power supply 103. The size of each incremental step may be based on the same considerations that were discussed above in connection with the size of the steps dictated by the soft connect algorithm 193.

Any technique may be used to determine when the incrementally-changing voltage $V_A$ reaches the target voltage $V_T$. In one embodiment, the inputs 185 and 187 to the analog-to-digital converter 181 may be coupled across the load 105, as shown in FIG. 1. The digital data output 183 of the analog-to-digital converter 181 may be delivered to the servo algorithm 194. The servo algorithm 194 may be configured to compare the voltage represented by the digital data output 183 to the target voltage $V_T$. When they are substantially equal, the servo algorithm 194 may be configured to cease incrementing the digital data that is delivered to the input 163 of the digital-to-analog converter 161. The servo algorithm 194 may be configured to also maintain the voltage across the load 105 at the commanded value $V_T$ after the time $T_4$, notwithstanding transients in the output 123 of the power supply 103 and/or changes in the load 105.

At some time later in the process, the processing system 191 may receive a command to change the target voltage $V_T$ on the load 105 to another value, through the same or different means as it received the original alter command. If this happens, the processing system 191, still operating under the control of the servo algorithm 195, may again deliver incrementally-changing data values to the input 163 of the digital-to-analog converter 161 until the voltage across the load 105 reaches the new value for $V_T$. One or more further alter commands to the processing system 191 for further alterations in the target voltage $V_T$ may also be made and handled in the same or in a different manner.

At a time $T_5$, the processing system 191 may receive a command, in the same or different manner as it received the original command, to decouple the power supply margin controller 101 from the feedback node 129, thus causing the output 123 of the power supply 103 to return to its pre-coupled value.

If the processing system 191 simply opened the controlled switch 141 at this time, however, the sudden change in the voltage on the feedback node 129 might cause undesirable perturbations in the output 123 of the power supply 103. Instead, the processing system may be configured to switch to implementing the soft disconnect algorithm 195 which, in turn, may be configured to increment $V_A$ back down (or up) to the value that it had been at just before the controlled switch 141 was closed at the time $T_3$. The soft disconnect algorithm 195 may be configured to do this by causing the data value that is delivered to the input 163 to the digital-to-analog converter 161 to decrease (or increase) in incremental steps, beginning at the time $T_5$. This incrementing may continue until a time $T_6$ when the data value at the input 163 to the digital-to-analog converter 161 reaches the data value that was delivered to the input 163 of the digital-to-analog converter 161 when the values of $V_A$ and $V_O$ at the inputs 157 and 155, respectively, to the comparator 151 were substantially equal. The processing system 191 may be configured to store the data value that was delivered to the input 163 of the digital-to-analog converter 161 at the time $T_3$, when $V_A$ was substantially equal to $V_O$, and to access this stored value at this stage of the process to enable it to make this determination.

At the time $T_7$, the soft disconnect algorithm 195 may be configured to direct the control input 147 to the controlled switch 141 to cause the controlled switch 141 to open, thus decoupling the power supply margin controller 101 from the feedback node 129. This may allow $V_O$ to return to the value that it had prior to the coupling of the power supply margin controller 101, as shown in FIG. 2, without unduly perturbing the feedback node 129.

The value of the scaling resistance 197 may be selected so as to restrict the degree to which the power supply margin controller 101 may cause an alteration in the output 123 of the power supply 103. This may protect the power supply 103 and/or the load 105 from unexpectedly large swings that might otherwise be caused by inappropriate alteration commands being delivered to the processing system 191 and/or by a fault in the circuitry and/or code of the power supply margin controller 101. In one embodiment, the value of the scaling resistance 197 may be selected so as to restrict alterations in the output 123 of the power supply 103 to a maximum deviation of ±10%.

Figure 3:
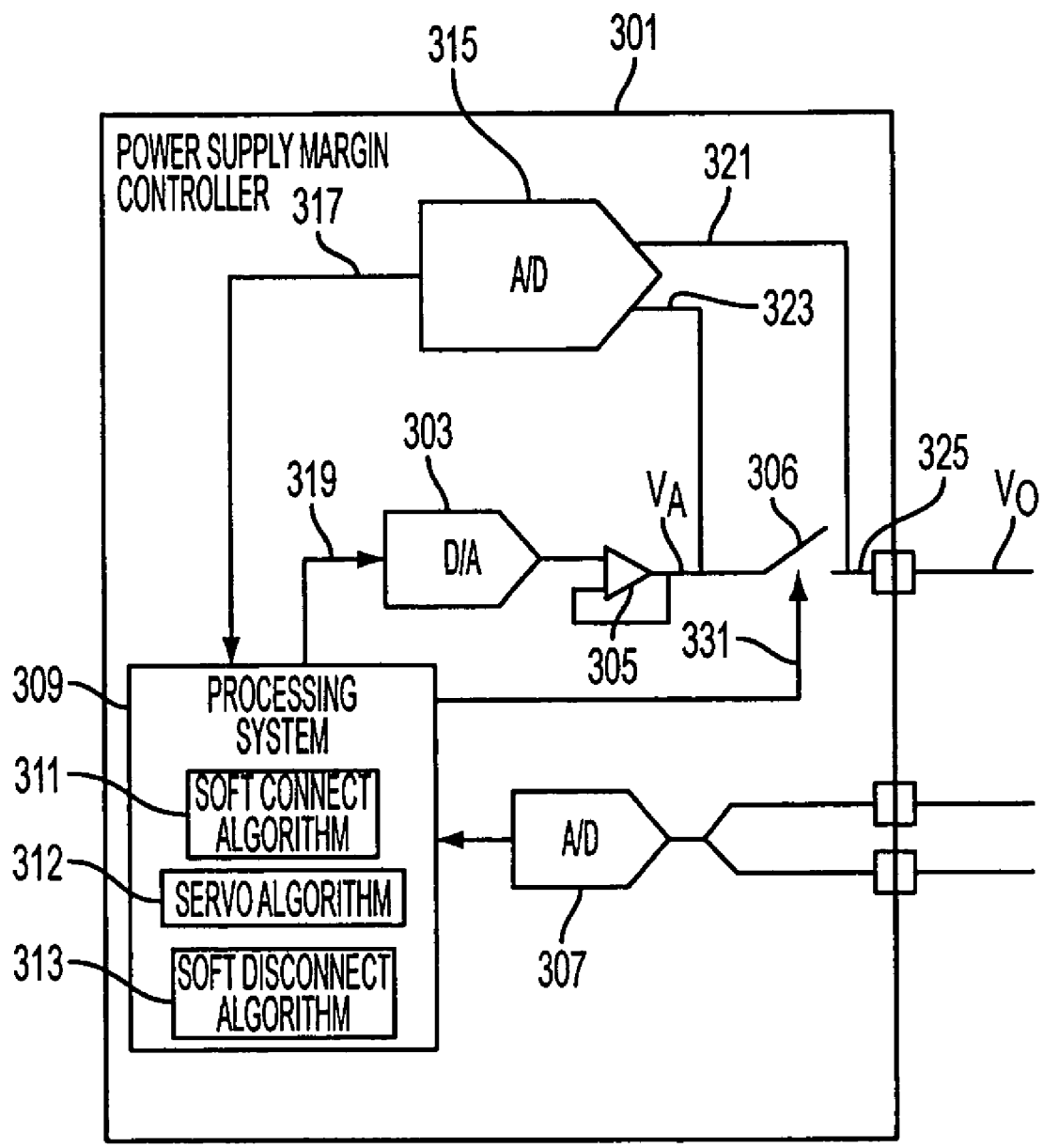
FIG. 3 illustrates an alternate embodiment of a power supply margin controller using an analog-to-digital converter.

FIG. 3 illustrates an alternate embodiment of a power supply margin controller using an analog-to-digital converter. A power supply margin controller 301 may include a digital-to-analog converter 303, a buffer 305, an analog-to-digital converter 307, a second analog-to-digital converter 315, and a processing system 309 having a soft connect algorithm 311, a servo algorithm 312, and soft disconnect algorithm 313.

With the exception of the analog-to-digital converter 315 and the soft connect algorithm 311, the components of the power supply margin controller 301 may consist of and may be configured, operated, and coupled just like their corresponding components illustrated in FIG. 1 and discussed above. The power supply margin controller 301 may also be coupled to a load and to a power supply of the same type and in the same way as was discussed above and illustrated in FIG. 1 in connection with the power supply margin controller 101.

Instead of the comparator 151 illustrated in FIG. 1, however, the power supply margin controller 301 may use the analog-to-digital converter 315. The analog-to-digital converter 315 may be any type of analog-to-digital converter. The output 317 from the analog-to-digital converter 315 may be digital data representing the difference between a first input 321 and a second input 323 to the analog-to-digital converter 315, namely the difference between $V_A$ and $V_O$ when the controlled switch 306 is in its open state. Unlike the configuration shown in FIG. 1, the processing system 309 may therefore now know the difference between $V_A$ and $V_O$, not merely which is the greater of the two.

This more specific information may be used by the processing system 309, operating under the control of the soft connect algorithm 311, to more quickly deliver the needed digital data value to the input 319 of the digital-to-analog converter 303, so as to more quickly cause $V_A$ to become substantially equal to $V_O$. This may enable the power supply margin controller 301 to be quickly coupled to the feedback node (not shown in FIG. 3), while still minimizing any perturbing of that node.

To accomplish this greater speed, the soft connect algorithm 311 may be different than the soft connect algorithm 193 in FIG. 1. The soft connect algorithm 311 may include a converging algorithm configured to utilize the difference between $V_A$ and $V_O$ that is provided by the analog-to-digital converter 315 to calculate a value of the data input 319 to the digital-to-analog converter 303 that is likely to cause $V_A$ to substantially equal $V_O$. Because of offsets and variations in the tolerances of the various components that may be used in the power supply margin controller 301, however, it may not be possible for the soft connect algorithm 311 to correctly calculate the needed target value of the digital data input 319 during its first calculation. Instead, several iterations of this process may be needed using the converging algorithm that is part of the soft connect algorithm 311, so as to ultimately cause the difference between $V_A$ and $V_O$ to be within a permissible range of error that has been predetermined. An example of this is illustrated in FIG. 4 and will now be discussed.

Figure 4:
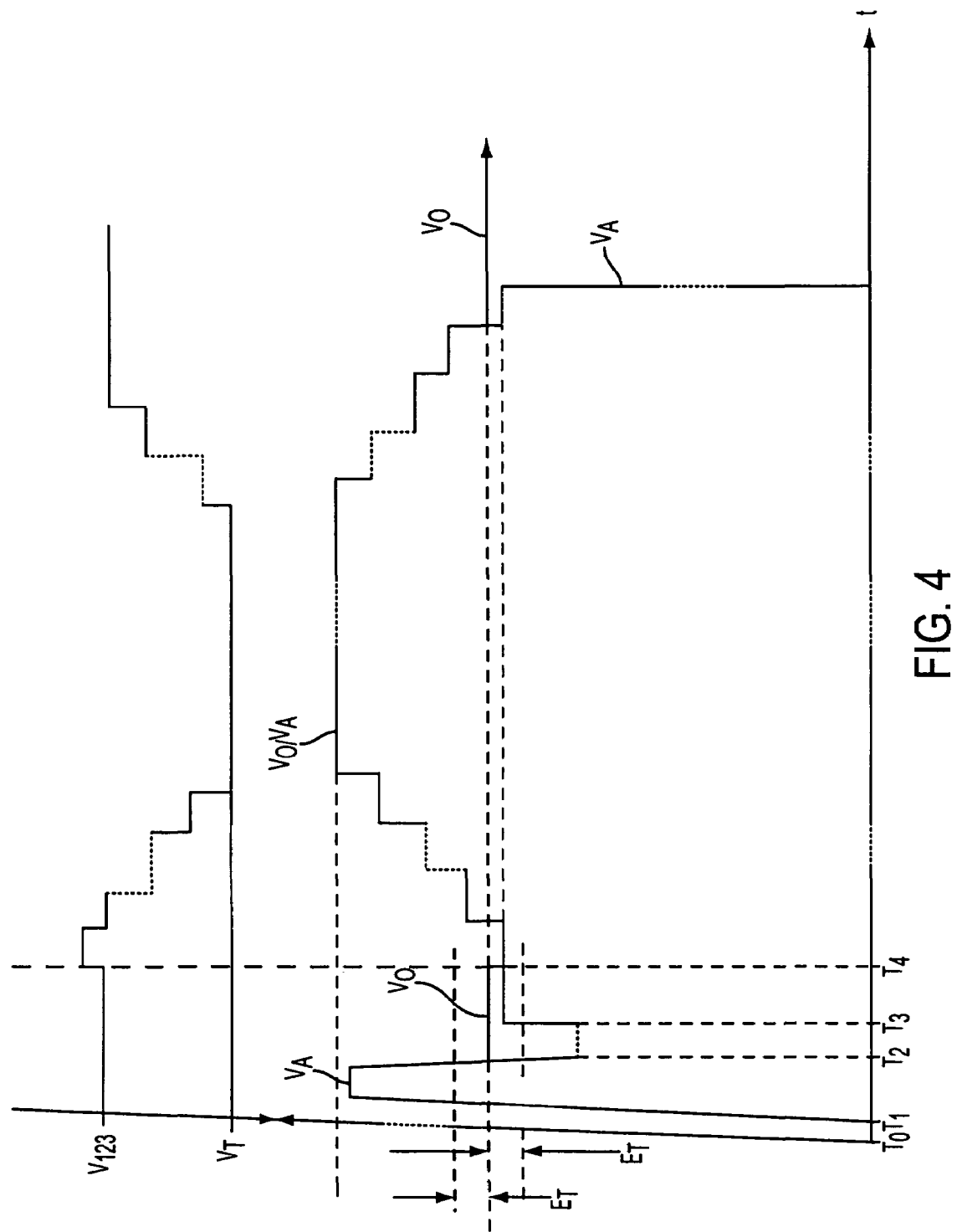
FIG. 4 illustrates three voltages that may be found in the power supply margin controller illustrated in FIG. 3.

FIG. 4 illustrates three voltages that may be found in the power supply margin controller illustrated in FIG. 3. More particularly, FIG. 4 illustrates traces for the voltages $V_A$ and $V_O$ in FIG. 3 as well as the voltage at 123 in FIG. 1. Different traces may be found in connection with other configurations.

The controlled switch 306 may begin in its open position, just like the controlled switch 141 did in FIG. 1. At a time $T_0$, an alter command may be received by the processing system 309 to alter the output of the power supply to a new value $V_T$. Unlike the soft connect algorithm 193 illustrated in FIG. 1, however, the soft connect algorithm 311 has the benefit of knowing the degree of difference between $V_A$ and $V_O$ because of the data output 317 from the analog-to-digital converter 315. Using this information, the soft connect algorithm 311 may employ a converging algorithm to estimate the needed value of the data input 319 to the digital-to-analog converter 303 that is likely to cause $V_A$ to substantially equal $V_O$. It may then cause the processing system 309 at a time $T_1$ to deliver this value to the input 319 to the digital-to-analog converter 303.

This may cause $V_A$ to jump to a value that is much closer to $V_O$ at the time $T_1$, as shown in FIG. 4. However, the difference between their values may still exceed a predetermined error threshold $E_T$, as also illustrated in FIG. 4. As a consequence, the soft connect algorithm 311 may be configured using its converging algorithm to recalculate the data value that needs to be delivered to the input 319 to the digital-to-analog converter 303, and to cause the processing system 309 to deliver that adjusted value at a time $T_2$, as also reflected in FIG. 4. This time, $V_A$ may be even closer to $V_O$, but the difference may still exceed the error threshold $E_T$. As a consequence, the soft connect algorithm 311 may be configured to calculate a still further value for the data that is delivered to the input 319 of the digital-to-analog converter 303 and to cause the processing system 309 to deliver this adjusted value to the input 319 of the digital-to-analog converter 303. This iterative, converging process may continue until a time $T_3$ when the difference between $V_A$ and $V_O$, as measured by the analog-to-digital converter 315, is less than the error threshold $E_T$, as illustrated in FIG. 4. When at a time $T_4$ and the difference between $V_A$ and $V_O$ to below the error threshold $E_T$, the soft connect algorithm 193 may cause the processing system 309 to deliver a control command to a control input 331 to the controlled switch 306 at a time $T_4$, as reflected in FIG. 4, thus causing the controlled switch 306 to close, thus softly connecting the power supply margin controller 301 to the feedback node 129.

The power supply margin controller 301 may then switch to utilizing the servo algorithm 312 which may be configured to incrementally step $V_A$ to the target voltage $V_T$, just as was described above in connection with the power supply margin controller 101 and the servo algorithm 194 in FIG. 1. The power supply margin controller 301 may similarly continue to receive one or more alter commands to again alter the value of the output of the power supply to a new $V_T$. The power supply margin controller 301 may similarly receive a command to decouple itself from the feedback node 129, in which case it may switch to the soft disconnect algorithm 313 which may be configured to proceed as described above in connection with the soft disconnect algorithm 195. These similarities between the servo and soft disconnect algorithms in FIGS. 1 and 3 are also evidenced by the similarities between the traces of $V_A$ and $V_O$ after the time $T_3$ in FIG. 2 and the time $T_4$ in FIG. 4.

One principal difference between the power supply margin controller 301 shown in FIG. 3 and the power supply margin controller 101 shown in FIG. 1 may be the manner in which $V_A$ is adjusted to substantially match $V_O$ prior to the closure of the controlled switch 306 (in FIG. 3) and 141 (in FIG. 1). In the embodiment shown in FIG. 1, $V_A$ is incrementally increased (or decreased) until the comparator changes state. In the embodiment shown in FIG. 3, the difference between $V_A$ and $V_O$ is measured and used in conjunction with a converging algorithm to cause $V_A$ to converge to the value of $V_O$ until the difference is less than a predetermined error threshold. The process implemented in connection with the power supply margin controller 301 shown in FIG. 3 may be faster than the one implemented in connection with power supply margin controller 101 shown in FIG. 1. However, the analog-to-digital converter 315 in FIG. 3 may be more costly than the comparator 151 in FIG. 1.

Figure 5:
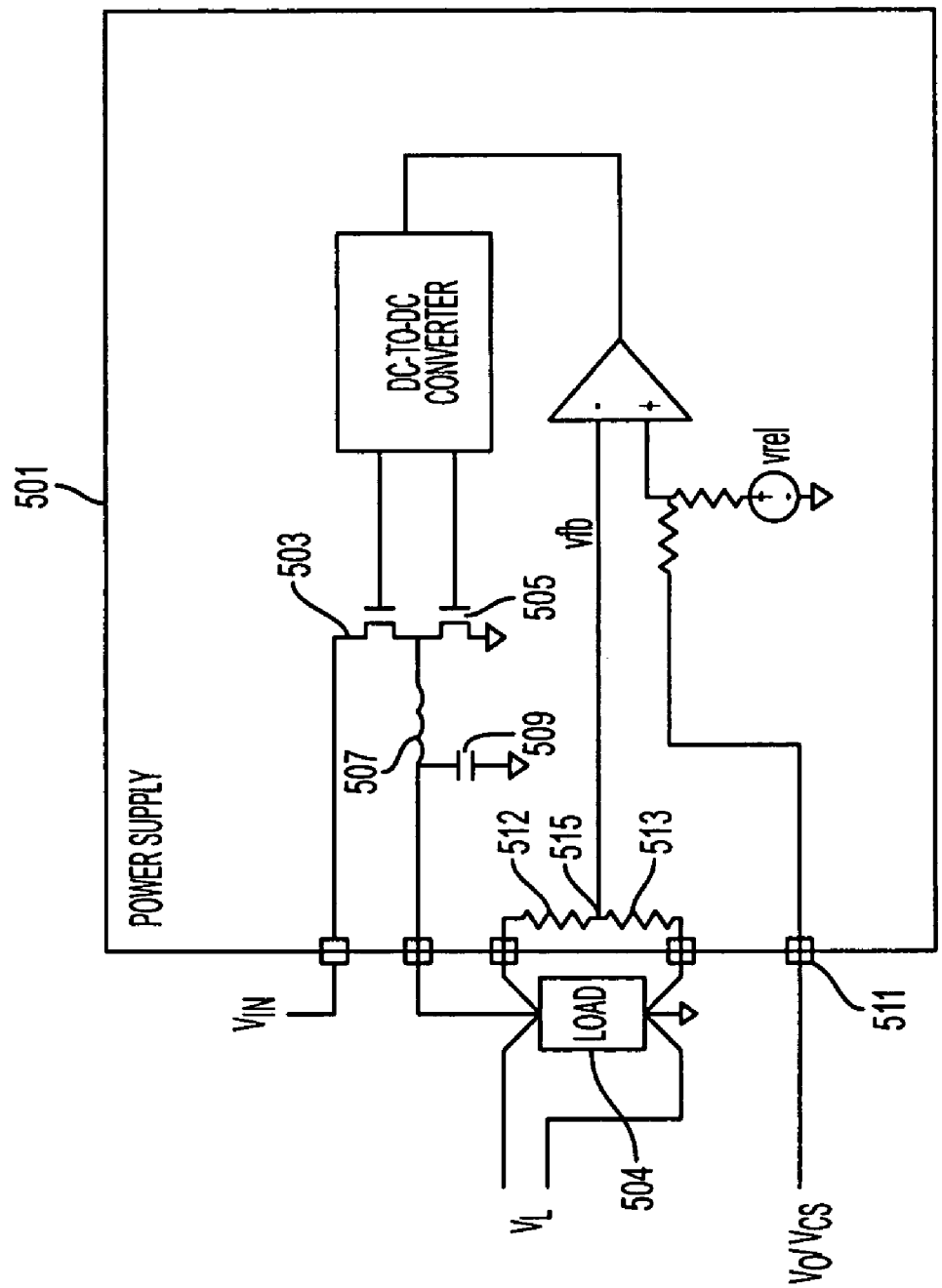
FIG. 5 illustrates an alternate embodiment of a power supply coupled to a load.

FIG. 5 illustrates an alternate embodiment of a power supply 501 coupled to a load 504. The power supply 501 may include output FETs 503 and 505, a filtering inductance 507, a filtering capacitance 509, and a feedback node 515 that is generated by a voltage divider network that includes resistances 512 and 513.

In the embodiment of the power supply that is shown in FIG. 5, all of the components of the power supply that are shown within the rectangle labeled 501 may be potted in a single, integrated module. As a consequence, the feedback node 515 may not be accessible to an external connection, as it is in FIG. 1. Instead, the power supply 501 may include a voltage adjustment node 511 that is coupled to an external pin on the potted module that is configured to receive and generate a voltage adjustment signal. With such a module power supply, the voltage adjustment node 511 may be directly coupled to $V_O$ in the power supply margin controller, that is, for example, to the switching connection 145 shown in FIG. 1 or to the switching connection 325 shown in FIG. 3. With this embodiment of a power supply, there may not be a need for any scaling resistance between the voltage adjustment node 511 and the input/output of the power supply margin controller, such as the scaling resistance 197 shown in FIG. 1.

The components, steps, features, objects, benefits and advantages that have been discussed are merely illustrative. None of them, nor the discussions relating to them, are intended to limit the scope of protection in any way. Numerous other embodiments are also contemplated, including embodiments that have fewer, additional, and/or different components, steps, features, objects, benefits and advantages. The components and steps may also be arranged and ordered differently. In short, the scope of protection is limited solely by the claims that now follow. That scope is intended to be as broad as is reasonably consistent with the language that is used in the claims and to encompass all structural and functional equivalents.

The term "coupled" as used herein embraces both direct connections and indirect connections that contain one or more intervening components.

The phrase "means for" when used in a claim embraces the corresponding structure and materials that have been described and their equivalents. Similarly, the phrase "step for" when used in a claim embraces the corresponding acts that have been described and their equivalents. The absence of these phrases means that the claim is not limited to any corresponding structures, materials, or acts.

Nothing that has been stated or illustrated is intended to cause a dedication of any component, step, feature, object, benefit, advantage, or equivalent to the public, regardless of whether it is recited in the claims.

We claim:

1. A power supply margin controller for altering the magnitude of a control signal used to control the output power of a power supply, comprising:
   a digital-to-analog converter having an input and an output;
   a comparator having a first input coupled to receive the control signal, a second input coupled to the output of the digital-to-analog converter, and an output; and
   a processing system configured to deliver data to the input of the digital-to-analog converter based on the output from the comparator that causes signals at the inputs to the comparator to be substantially equal.

2. The power supply margin controller of claim 1 wherein the processing system is configured to cause the output of the digital-to-analog converter to be coupled to the control signal.

3. The power supply margin controller of claim 2 further comprising an controlled switch having a control input coupled to the processing system and having switching connections coupled to the output of the digital-to-analog converter and to the control signal, wherein the processing system is configured to cause the output of the digital-to-analog converter to be coupled to the control signal by directing the control input to close the switch.

4. The power supply margin controller of claim 2 wherein the processing system is configured to cause the output of the digital-to-analog converter to be coupled to the control signal after having delivered data to the input of the digital-to-analog converter that causes signals at the inputs to the comparator to be substantially equal.

5. The power supply margin controller of claim 4 wherein the processing system is configured to deliver data to the input of the digital-to-analog converter that causes the magnitude of the control signal to be altered after causing the output of the digital-to-analog converter to be coupled to the control signal.

6. The power supply margin controller of claim 5 wherein the processing system is configured to cause the output of the digital-to-analog converter to be decoupled from the control signal after having caused the magnitude of the control signal to be altered.

7. The power supply margin controller of claim 6 wherein the processing system is configured to deliver data to the input of the digital-to-analog converter that causes the magnitude of the control signal to be returned to its pre-altered value before causing the output of the digital-to-analog converter to be decoupled from the control signal.

8. The power supply margin controller of claim 2 wherein the control signal is generated at a feedback node that includes a voltage-divider network and wherein the processing system is configured to cause the output of the digital-to-analog converter to be coupled to the voltage-divider network.

9. The power supply margin controller of claim 8 further comprising a resistance and wherein the output of the digital-to-analog converter is coupled to the voltage-divider network through the resistance.

10. The power supply margin controller of claim 9 wherein the resistance has a value that prevents the power supply margin controller from altering the output voltage of the power supply by more than a predetermined amount.

11. The power supply margin controller of claim 2 wherein the digital-to-analog converter is coupled to the control signal through a buffer.

12. The power supply margin controller of claim 2 wherein the power supply is potted, the control signal appears on an external pin of the potted power supply, and wherein the processing system is configured to cause the output of the digital-to-analog converter to be coupled to the external pin.

13. The power supply margin controller of claim 1 wherein the comparator includes a one bit quantizer.

14. The power supply margin controller of claim 13 wherein the processing system is configured to deliver data to the input of the digital-to-analog converter that incrementally changes in value until the comparator switches state.

15. The power supply margin controller of claim 1 wherein the second input of the comparator is coupled to the output of the digital-to-analog converter through a buffer.

16. A power supply margin controller for altering the magnitude of a control signal used to control the output power of a power supply, comprising:
   a digital-to-analog converter having an input and an output;
   an analog-to-digital converter having a first analog input coupled to the control signal, a second analog input coupled to the output of the digital-to-analog converter, and a digital output representative of the difference between the first and second analog inputs; and
   a processing system configured to deliver data to the input of the digital-to-analog converter based on the output from the analog-to-digital converter that causes the output of the analog-to-digital converter to be representative of a magnitude below a pre-determined threshold.

17. The power supply margin controller of claim 16 wherein the processing system is configured to implement a converging algorithm to cause the output of the analog-to-digital converter to be representative of the magnitude below the pre-determined threshold.

18. A power supply margin controller for altering the magnitude of a control signal used to control the output power of a power supply, comprising a processing system including a memory portion storing a program for controlling the processing system to receive and store information representative of the magnitude of the control signal prior to the altering, to then temporarily cause an alteration in the magnitude of the control signal, and to then cause the control signal to substantially return to its pre-altered voltage based on the stored information.

19. The power supply margin controller of claim 18 wherein the processing system is controlled to cause the alteration in a plurality of incremental steps.

20. The power supply margin controller of claim 18 wherein the processing system is controlled to cause the return in a plurality of incremental steps.

21. The power supply margin controller of claim 20 wherein the processing system is controlled to cause the alteration in a plurality of incremental steps.

22. A matching power source for generating power that substantially matches a reference, comprising:
   a controllable power source for generating a controllable power;
   a comparator having a first input coupled to the controllable power source, a second input coupled to the reference, and an output; and
   a processing system configured for controlling signals at the inputs to the comparator to be substantially equal based on the output from the comparator for controlling the controllable power source.

23. A power supply margin controller for altering the magnitude of a first control signal used to control the output power of a power supply, comprising:
   a first node to be coupled to a second node of a power supply, the second node being supplied with the first control signal from the power supply; and
   a processing system for adjusting the magnitude of a second control signal on the first node to substantially be equal to that of the first control signal, and coupling the first node with the second node in order to control the output power of the power supply.

24. The power supply margin controller of claim 23, wherein the processing system is configured for controlling the magnitude of the first control signal on the coupled first and second nodes to control the output power of the power supply when the first and second nodes are coupled.

25. The power supply margin controller of claim 24 wherein the processing system is configured for controlling the magnitude of the first control signal in a plurality of incremental steps.

26. The power supply margin controller of claim 24, wherein the processing system is configured for controlling the magnitude of the first control signal to substantially equal to the magnitude of the second control signal at the time of coupling the first node with the second node, for decoupling the first node from the second node.

27. The power supply margin controller of claim 26 wherein the processing system is configured for controlling the magnitude of the first control signal in a plurality of incremental steps.

28. The power supply margin controller of claim 26 wherein the processing system is configured for storing the magnitude of the second control signal at the time of coupling the first node with the second node.

29. A power source comprising:
   a controllable power source for generating a controllable power;
   a first node coupled to the controllable power source, the first node receiving a first control signal used to control the output power of the controllable power source;
   a second node for receiving a second control signal;
   a comparator having a first input coupled to the first node, a second input coupled to the second node, and an output;
   a processing system configured for adjusting the magnitude of the second control signal on the first node to substantially be equal to that of the first control signal based on the output from the comparator so as to couple the first node with the second node.

30. The power source of claim 29, wherein the processing system is configured for controlling the magnitude of the first control signal on the coupled first and second nodes to control the output power of the controllable power source when the first and second nodes are coupled.

31. The power source of claim 29, wherein the processing system is configured for controlling the magnitude of the first control signal to substantially equal to the magnitude of the second control signal at the time of coupling the first node with the second node, for decoupling the first node from the second node.

32. The power source of claim 29 wherein the processing system is configured for storing the magnitude of the second control signal at the time of coupling the first node with the second node.

* * * * *